US006405217B1

(12) United States Patent
Lee

(10) Patent No.: US 6,405,217 B1
(45) Date of Patent: Jun. 11, 2002

(54) STATE-BASED IMPLEMENTATION OF TRANSACTIONS ON A FILE SYSTEM

(75) Inventor: Henry Lee, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,639

(22) Filed: Sep. 21, 1998

(51) Int. Cl.⁷ .............................................. G06F 12/00
(52) U.S. Cl. ...................................... 707/200; 707/100
(58) Field of Search ........................... 707/1, 7, 8, 10, 707/101, 102, 103, 104, 201, 100, 200

(56) References Cited

U.S. PATENT DOCUMENTS

| | | | | |
|---|---|---|---|---|
| 4,935,869 A | * | 6/1990 | Yamamoto .................. | 364/200 |
| 5,455,947 A | * | 10/1995 | Suzuki et al. ............... | 395/650 |
| 5,465,365 A | * | 11/1995 | Winterbottom ............. | 395/600 |
| 5,623,666 A | * | 4/1997 | Pike et al. .................. | 395/616 |
| 5,729,696 A | * | 3/1998 | Goodwin, III et al. ...... | 395/222 |
| 5,794,252 A | * | 8/1998 | Bailey et al. ............... | 707/202 |
| 5,835,689 A | * | 11/1998 | Braun et al. ................ | 395/113 |
| 5,857,204 A | * | 1/1999 | Lordi et al. ................. | 707/202 |
| 5,909,540 A | * | 6/1999 | Carter et al. ........... | 395/182.02 |
| 5,918,229 A | * | 6/1999 | Davis et al. ................. | 707/10 |
| 5,941,947 A | * | 8/1999 | Brown et al. ............... | 709/225 |
| 6,009,266 A | * | 12/1999 | Brownell et al. ........... | 395/683 |
| 6,026,474 A | * | 2/2000 | Carter et al. ................ | 711/202 |
| 6,161,125 A | * | 12/2000 | Traversat et al. ........... | 709/203 |

OTHER PUBLICATIONS

Kistler et al., "Disconnected Operation in the Coda File System," School of Computer Science, Carnegie Mellon University, Pittsburgh, PA, pp. 213–225 (1991).

Conradi et al., "Version Models for Software Configuration Management," *ACM Computing Surveys*, vol. 30, No. 2 (Jun. 1998).

Rosenblum et al., "The Design and Implementation of a Log–Structured File System," Electrical Engineering and Computer Sciences, Computer Science Division, University of California, Berkeley, CA, pp. 1–15 (1991).

Gray et al., "Transaction Processing: Concepts and Techniques," Morgan Kaufmann Publishers, San Francisco, CA, pp. 5–22, 67–78, 661–688 (1993).

* cited by examiner

*Primary Examiner*—Thomas Black
*Assistant Examiner*—Mary Wang
(74) *Attorney, Agent, or Firm*—Klarquist, Sparkman, LLP

(57) ABSTRACT

State-based offspring objects are created to correspond to each object in a file system when the corresponding object is opened. Each offspring object contains two fields, an original name field containing the name of the object as opened and a final name field. Each name change made to the object is written to the final name field so that the final name field always reflects the last change made to the name of the object. The various combinations of the fields define the offspring object's state. The offspring objects are arranged in a hierarchical structure that mimics the structure of the file system with the offspring object corresponding to the top level open object as its root. When the changes are committed, the state of the offspring object determines the operation to be performed on the corresponding object. Once the commit is completed, the original name field is overwritten with the final name. If changes are aborted, the original name is written to the final name field to revert the changes. A temporary offspring object is created when necessary to provide for circular renaming situations.

28 Claims, 11 Drawing Sheets

STATE-BASED IMPLEMENTATION OF TRANSACTIONS ON A FILE SYSTEM

FIELD OF THE INVENTION

This invention relates generally to file systems operating in a transaction environment, and more particularly to implementing file system transactions using a state-based scheme.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1997, Microsoft Corporation, All Rights Reserved.

BACKGROUND OF THE INVENTION

File systems in transaction-oriented environments support transactions performed against the components of the file system, i.e., the directories and files. The components make up the namespace of the file system.

Transaction-oriented file systems usually maintain a log of changes made to the names in the namespace and write the changes to persistent storage when the transaction commits the changes. Current file systems use a time-based list as the log and record each and every name change made in the namespace in chronological order so that the changes can be applied when the modifying transaction commits.

However, when more than one change is made to the same namespace component before the changes are committed, only the final change is of interest and using space to store the intermediate changes in the log is wasteful. Additionally, applying the intermediate changes in chronological order when the transaction commits is usually unnecessary and slows the performance of the file system.

Therefore, a way is needed to collapse the unnecessary intermediate changes into a final state for the file system namespace and to apply the final state to each component in the namespace.

SUMMARY OF THE INVENTION

The above-mentioned shortcomings, disadvantages and problems are addressed by the present invention, which will be understood by reading and studying the following specification.

State-based offspring objects are created to correspond to each object in a file system namespace when the corresponding object is opened. Each offspring object contains two fields, an original name field containing the name of the object when opened and a final name field. Each change made to the object is written to the final name field so that the final name field always reflects the last change made to the name of the object. The various combinations of the fields define the offspring object's state. The offspring objects are arranged in a hierarchical structure that mimics the structure of the namespace with the offspring object corresponding to the top level open object as its root. When the changes are committed, the state of the offspring object is used to determine the correct operation to be performed on the corresponding object. Once the commit completes, the final name is written into the original name field. If changes are aborted, the original name is written into the final name field.

In one aspect of the invention, the final names for objects at intermediate levels in the namespace hierarchy are written to memory when the changes are committed and only written to the file system's persistent storage when a commit is made at the top level open object. In another aspect of the invention, a temporary offspring object is created to accommodate a circular rename transaction.

Because an offspring object needs only the original and final name fields to define the state of a file system object and maintains only the last state of the object, the offspring objects of the present invention are less wasteful of memory space than the time-based log of the previous file system implementations. Additionally, a file system that uses the offspring objects of the present invention applies only the final state of the offspring object to the object, thus saving processing time. Special situations that require applying intermediate changes to the object are also implemented using the offspring objects so no special object types need be created.

The present invention can be practiced in a non-object-based file system using any data structure that incorporates the characteristics detailed above for the offspring object. Furthermore, the invention is applicable to file formats which support a hierarchical arrangement of data within a file that mimics a traditional file system.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular Microsoft Windows NT Native Structured Storage implementation of the invention is described. Finally, in the fifth section, a conclusion of the detailed description is provided.

Hardware and Operating Environment

Figure 1:
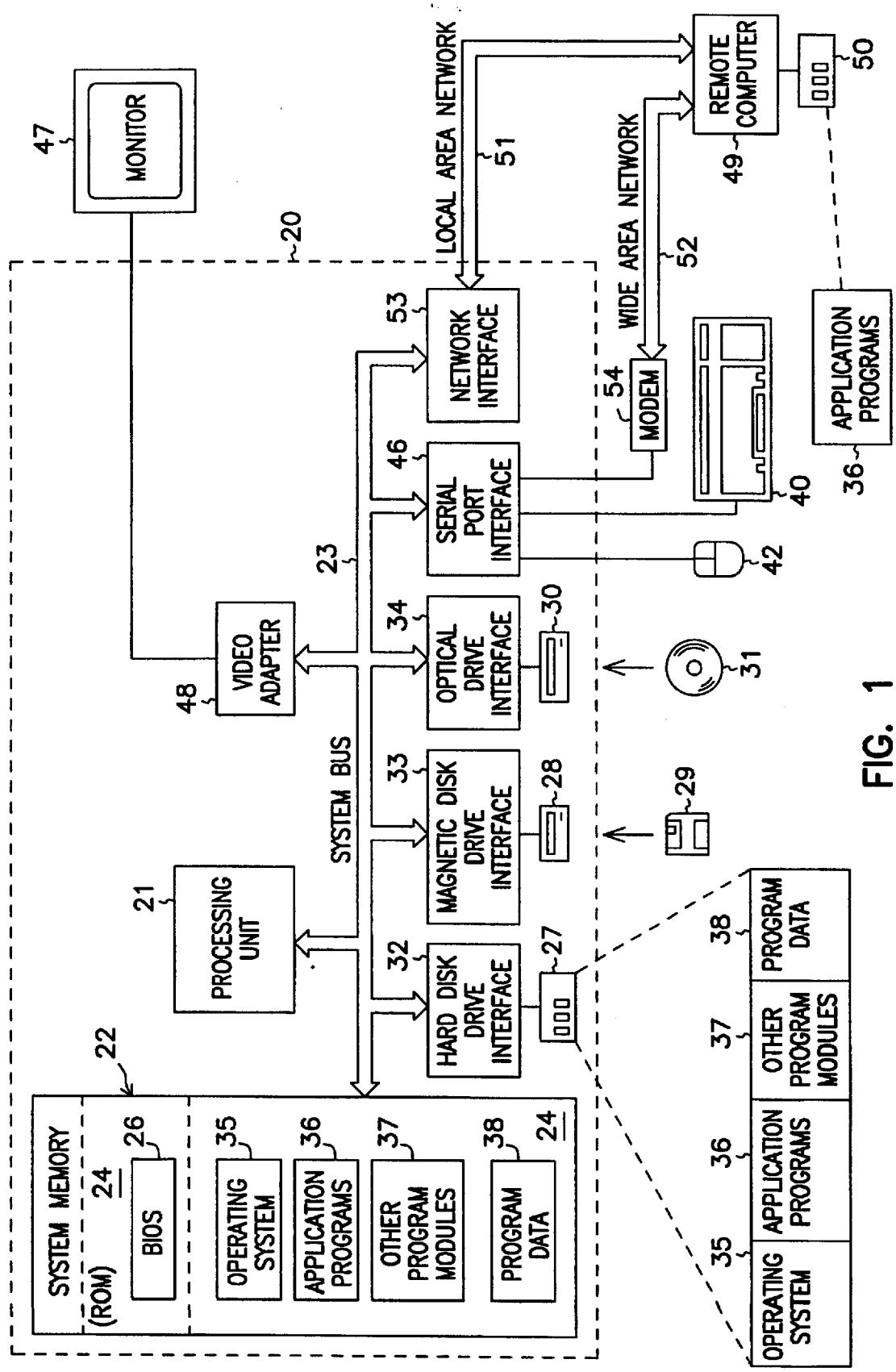
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

A system level overview of the operation of an exemplary embodiment of the invention is described by reference to FIGS. 2A–2G that illustrate offspring objects in conjunction with an object-based hierarchical file system in which directories and files are represented as objects within a namespace. Directory objects and data file objects are referred to collectively herein as elements or data elements. The data elements are invoked by processes, or threads within processes, executing in the operating environment of a computer, such as computer 20 in FIG. 1. If a process has multiple threads, each thread can be performing a transaction on the same set of elements. The term transaction is used herein to refer to transactions performed by a process and the threads within a process.

A transaction can perform five primary operations on the elements: creating an element, deleting an element, renaming an element, and opening/closing an element. The exemplary embodiment is practiced on a computer where the directories and files are permanently stored on persistent storage, such as the hard disk drive 27 in FIG. 1, and are read into the in-memory namespace when necessary. One of skill in the art will readily appreciate that the offspring objects are equally applicable to any data organization structured in a hierarchical manner, including non-object-based systems in which the offspring objects are represented by data structures having the required characteristics.

Figure 2A:
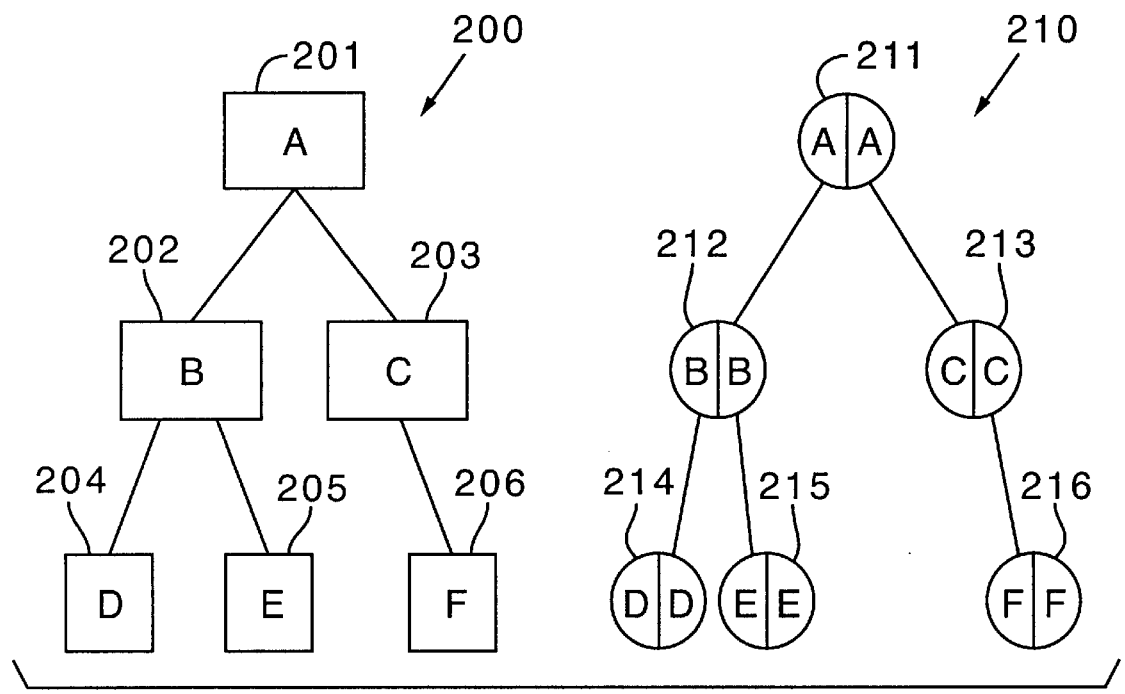
FIGS. 2A–G are diagrams illustrating a system-level overview of an exemplary embodiment of the invention.

When an existing element within the file system is opened by a transaction, a corresponding offspring object is created. FIG. 2A shows that a transaction has opened six elements in a directory tree 200. Element 201 is a directory A in the file system while element 202 and element 203 are subdirectories B and C within the directory A. Elements 204, 205, and 206 are data files D, E, and F stored within the subdirectories B and C. Although the directory tree 200 is shown in FIGS. 2B–2G as changing for purposes of illustration, the modifications are not made to the actual file system until the changing transaction commits its modifications.

Also shown in FIG. 2A is the offspring object hierarchy 210 which mimics the structure of the directory tree 200. The offspring object hierarchy 210 contains offspring object 211 that corresponds to the directory element 201, offspring objects 212 and 213 that correspond to the subdirectory elements 202 and 203, and offspring objects 214, 215 and 216 that correspond to the data file elements 204, 205, and 206. Each offspring object maintains two names for its corresponding element, an original (old) name and a final (new) name. In FIG. 2A, each offspring. object contains the original name of the corresponding element as both the original and final name because no changes have yet been made to the elements. FIGS. 2B, 2C, 2D, 2E, and 2F illustrate the offspring objects as changes are made to the elements in directory tree 200.

Figure 2B:
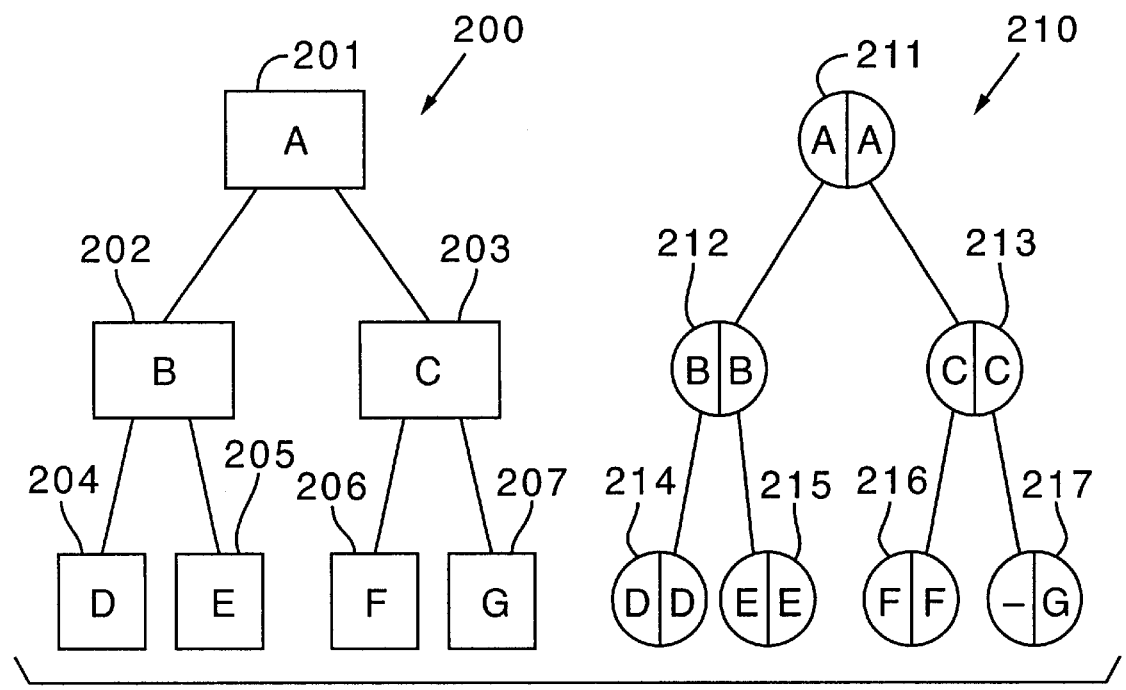

In FIG. 2B, data file element G 207 is created in the directory tree 200 in subdirectory 203. A corresponding offspring object 217 is added below the offspring object 213. The offspring object 217 contains a "-" (representing a NULL value) as the original name and "G" as the final name to indicate that the corresponding element 207 was created by the transaction.

Figure 2C:
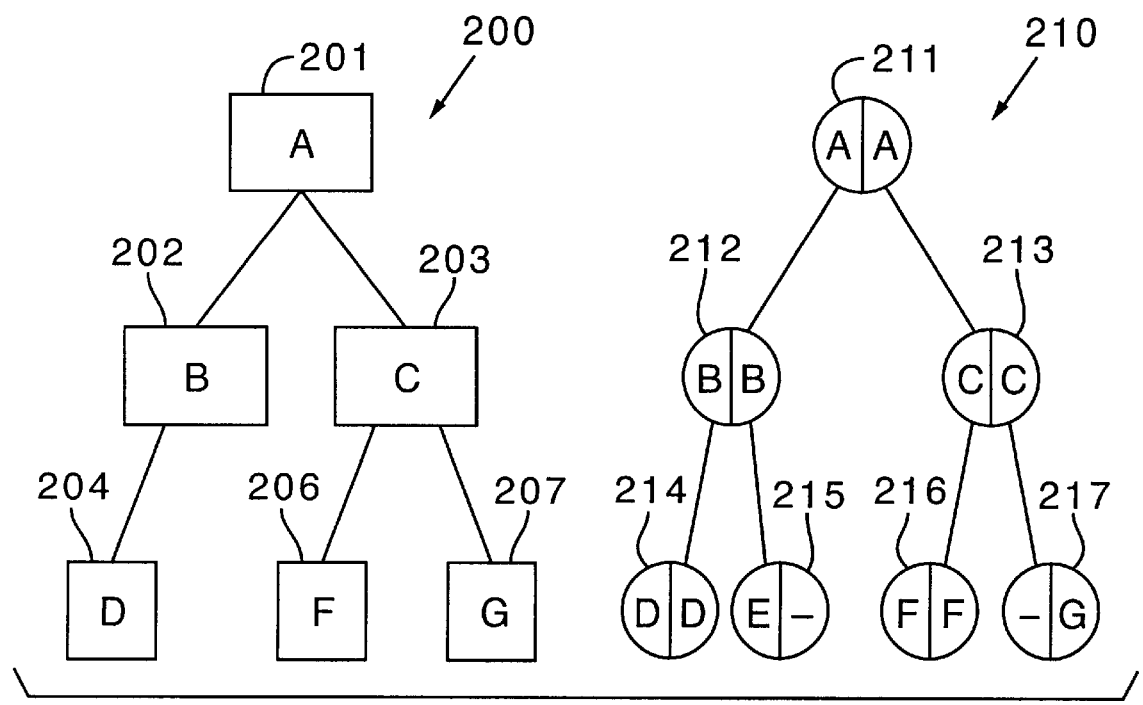

Turning now FIG. 2C, element E 205 is deleted from the directory tree 200. The corresponding object 215 now contains a "-" as the final name to indicate that the corresponding element 205 no longer exists within the directory tree 200.

Figure 2D:
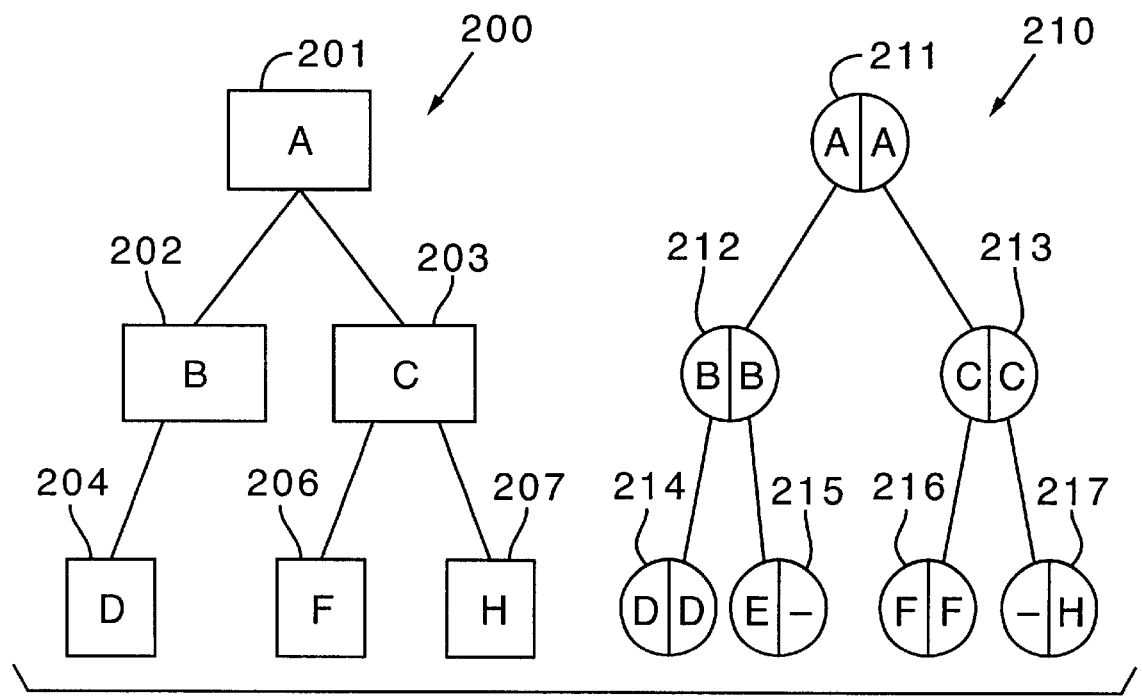

Next, the element 207 is renamed to "H" as shown in FIG. 2D. The letter "H" replaces the letter "G" as the final name in the offspring object 217. Note that information on intermediate names of the elements is not maintained in the offspring objects because the final name in an offspring only contains the last name change made to the corresponding element.

Figure 2E:
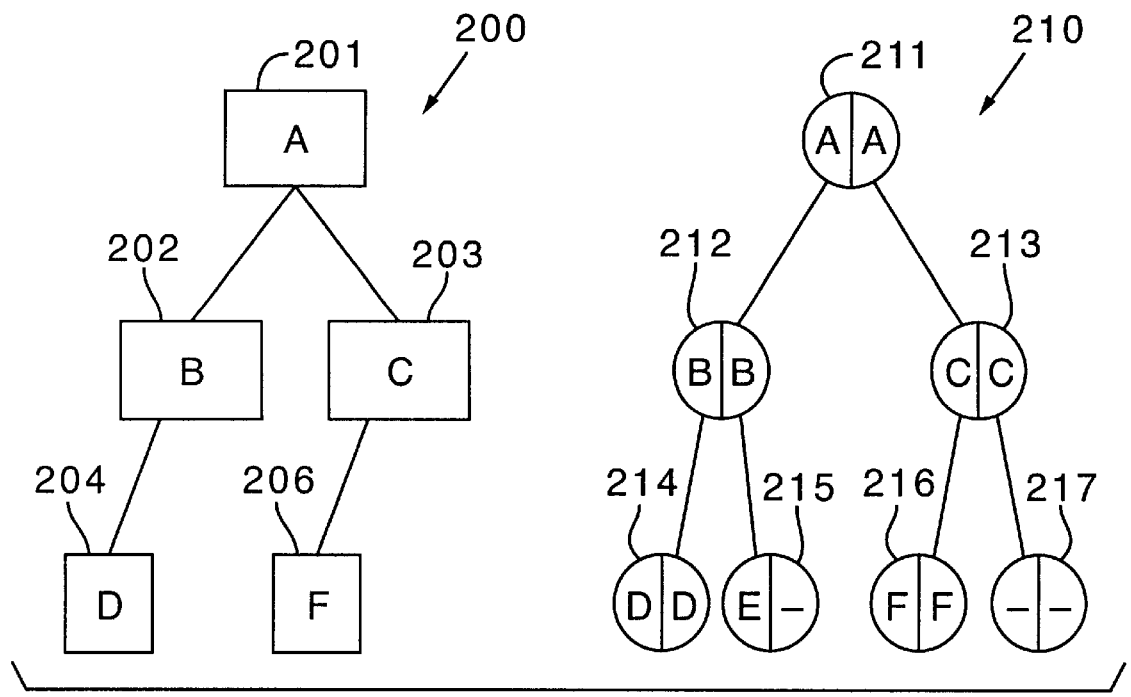

FIG. 2E illustrates the offspring hierarchy 210 when the element 207, now named "H," is deleted from the directory tree 200. The offspring object 217 contains a NULL value in the original name and a NULL value in the final name, i.e., the offspring object 217 is empty. In the present embodiment, the offspring object 217 remains in the offspring hierarchy 217 to be reused if necessary. In an alternate embodiment, the object 217 is deleted from the offspring hierarchy 210.

Figure 2F:
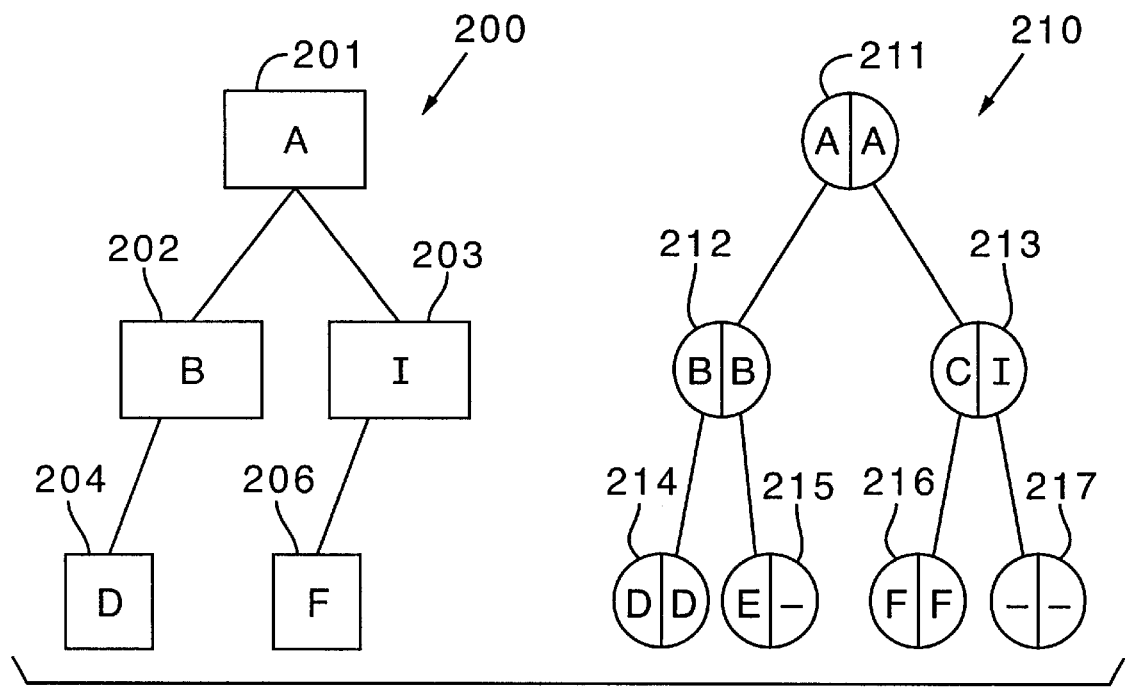

Finally, the subdirectory 203 is renamed from "C" to "I" as shown in FIG. 2F. The letter "I" replaces the letter "C" as the final name in the offspring object 213.

As a transaction commits each of the lower levels of changes, the final name information in the offspring objects that reflect the creation, deletion, and renaming of elements is written to memory. When a transaction commits the top level changes, the changes held in memory are written to permanent storage.

Thus, when the transaction commits the changes made at the data file level after the final change is made in FIG. 2F, the offspring objects 214 and 216 indicate that no name change is necessary because the original and the final names are the same, and neither name is NULL. The object 217 is "empty," indicating that the corresponding element was created and then deleted before the commit, so the offspring object 217 is deleted or marked as reusable.

Note that had the element 207 not been deleted, the offspring object 217 would have contained NULL in its original name and "H" in its final name which would have caused the corresponding data file element H to be created in the directory tree 200.

Once the commit on the data files is completed, the original names in the offspring objects 214 and 216 are replaced by the final names (in this case no change results since the names are the same). A new transaction in the same process can now work with the same data files within the subdirectories elements 202 and 203, open new data files in those directories, open different subdirectories with different data files, or add new subdirectories with new data files. The changes that have been committed to the data files are persistent and the data files cannot be rolled back to the any of the original names shown in FIGS. 2A–2F.

Figure 2G:
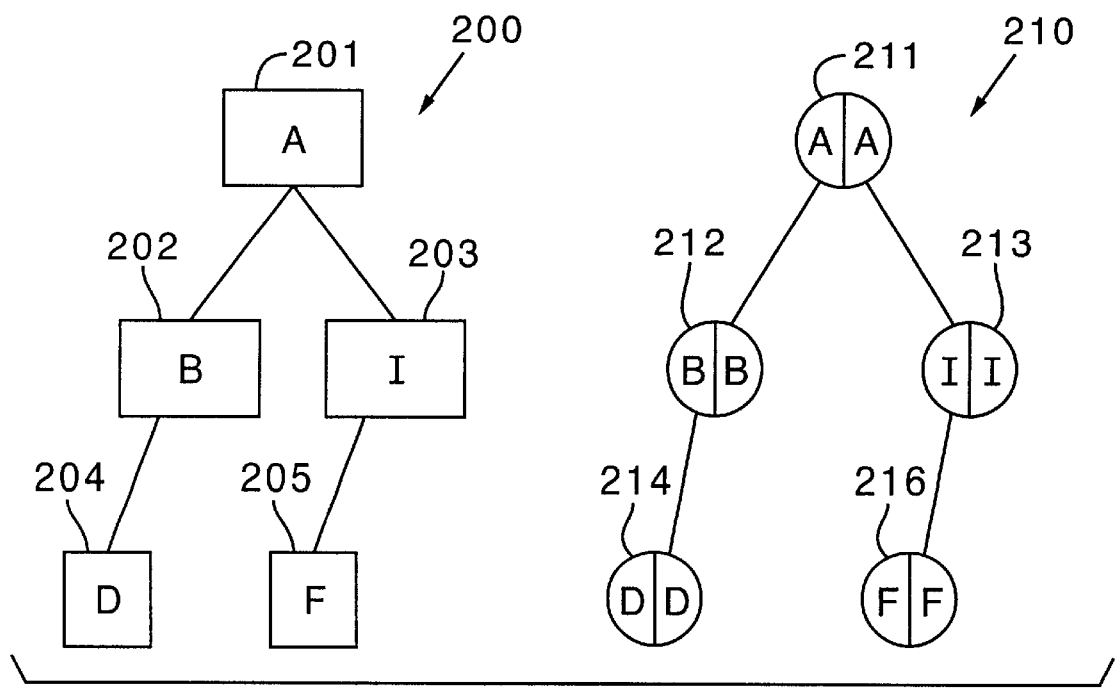

Assuming no further changes are to be made to the directory tree 200, the transaction commits changes made at the subdirectory level. No processing is necessary on the offspring object 212 because it indicates that the subdirectory element 212 was opened but the name was unchanged. The original and final names of the offspring object 213 are not NULL and are different so the final name of the offspring object 213 is written to memory to change the name of the element 203 from C to I. Once the commit is completed at the subdirectory level, the original names in the offspring objects 212 and 213 are overwritten with the final names as shown in FIG. 2G.

When the transaction commits at the directory (top level) of the directory tree 200, the underlying elements in memory are written to permanent storage. Had any changes been made to the directory element 201, the final name of the offspring object 211 also would be written to permanent storage. Once the changes have been written to permanent storage, any changes to the top level are also written to memory. The final name in the offspring object 211 is copied over the original name. The copies of the file system on permanent storage and in memory are now identical and appear as shown in FIG. 2G.

On the other hand, assume the transaction making the changes decides to "undo" its modifications to the directory tree 200 instead of committing them. In this case, no changes are written to either memory or to permanent storage as the changes are only reflected in the offspring object hierarchy 210. The original names in offspring objects 211-126 are copied over the final names (offspring object 217 is deleted because it is empty), resulting in the offspring object hierarchy 210 reverting to the structure shown in FIG. 2A.

In an alternate embodiment, the changes in the offspring objects at each level are immediately written to persistent storage when those changes are committed.

When a file, sub-directory, or directory is closed, the corresponding offspring object is deleted or marked as reusable.

The system level overview of the operation of an exemplary embodiment of the invention has been described in this section of the detailed description. Offspring objects are created to correspond to each object in a file system when the corresponding object is opened. The offspring objects contains two fields, one for the original name of the object and the other for the final name of the object, and combination of the fields define the offspring object's state and reflects the change that was last made to the corresponding object. When the changes are committed, the state of the offspring object is used to determine the correct operation to be performed on the corresponding object. While the invention is not limited to any particular hierarchical data structure, for sake of clarity a simplified object-based hierarchical file system has been described.

Methods of an Exemplary Embodiment of the Invention

In the previous section, a system level overview of the operation of an exemplary embodiment of the invention was described. In this section, the particular methods performed by the file system of such an exemplary embodiment are described by reference to a series of flowcharts. The methods to be performed by the file system constitute computer programs made up of computer-executable instructions. Describing the methods by reference to a flowchart enables one skilled in the art to develop such programs including such instructions to carry out the methods on suitable computers implementing the file system (the processor of the computer executing the instructions from computer-readable media. The flowcharts for the methods are shown in FIGS. 3, 4, 5, 6, 7A and 7B.

Figure 3:
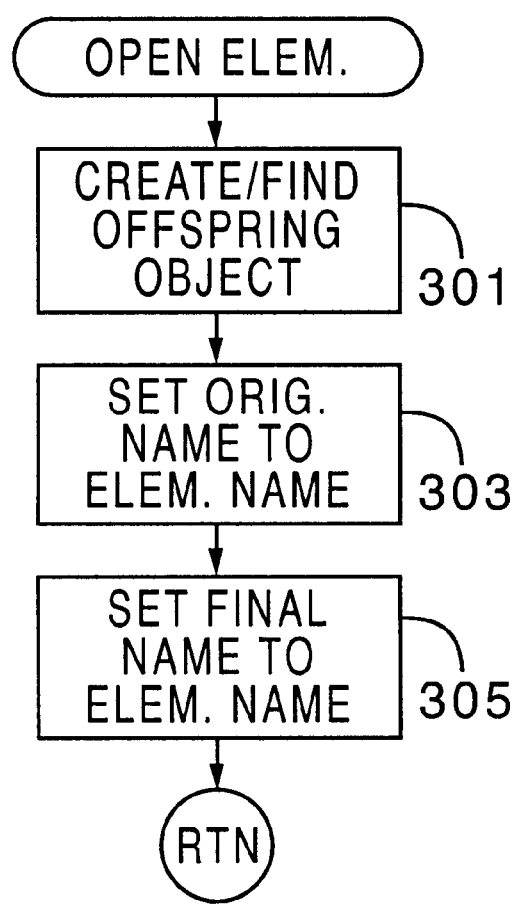
FIGS. 3, 4, 5, 6, 7A and 7B are flowcharts of methods to be performed by a file system according to an exemplary embodiment of the invention.

Referring first to FIG. 3, a flowchart of a method to be performed by the file system when opening an element in an exemplary embodiment of the invention is shown. The file system creates a new offspring object, or finds an existing offspring object, corresponding to the opened element (block 301). The original name and the final name in the offspring object are set to the element name (blocks 303, 305).

Figure 4:
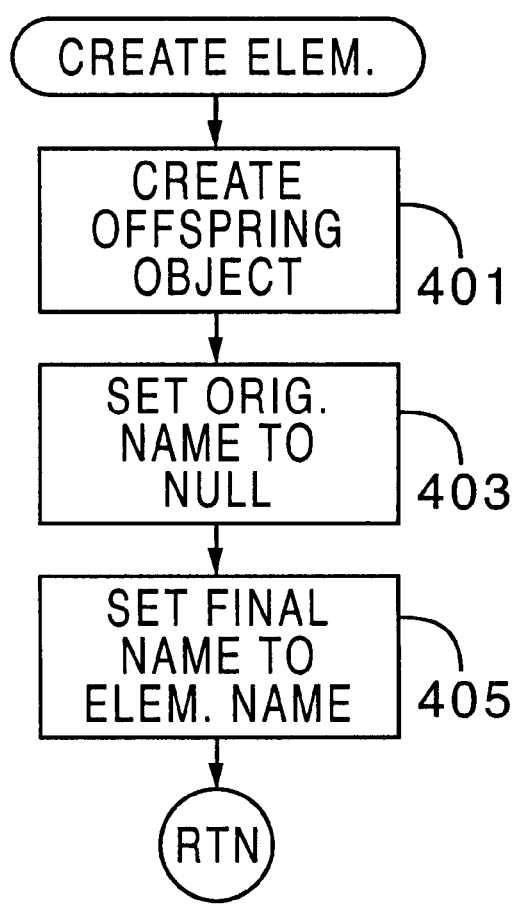
Figure 5:
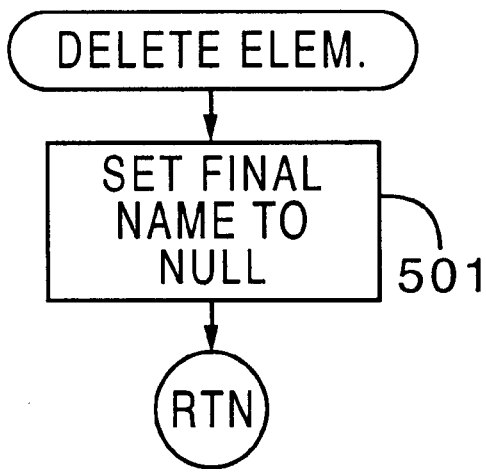
Figure 6:
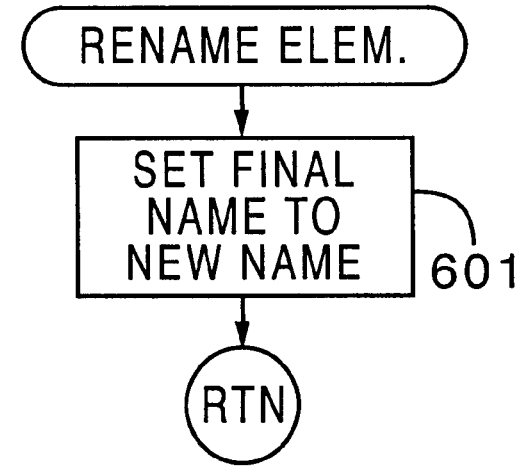

When an element is created by a transaction as shown in FIG. 4, the file system also creates an offspring object (block 401). The file system sets the original name of the offspring object to NULL (block 403) and sets the final name of the offspring object to the name of the newly created element (block 405).

When an element is deleted (FIG. 5) or renamed (FIG. 6), the corresponding offspring object already exists. Therefore, the file system needs only to set the final name of the corresponding offspring object to NULL if the element is deleted (block 501) or to the new name of the element if the element is renamed (block 601).

Note that if the element being deleted is a directory element or a subdirectory element, all the elements beneath it in the hierarchy must also be deleted. Therefore the file system calls the delete method in shown in FIG. 5 as many times as necessary, specifying the appropriate element on each call.

Figure 7A:
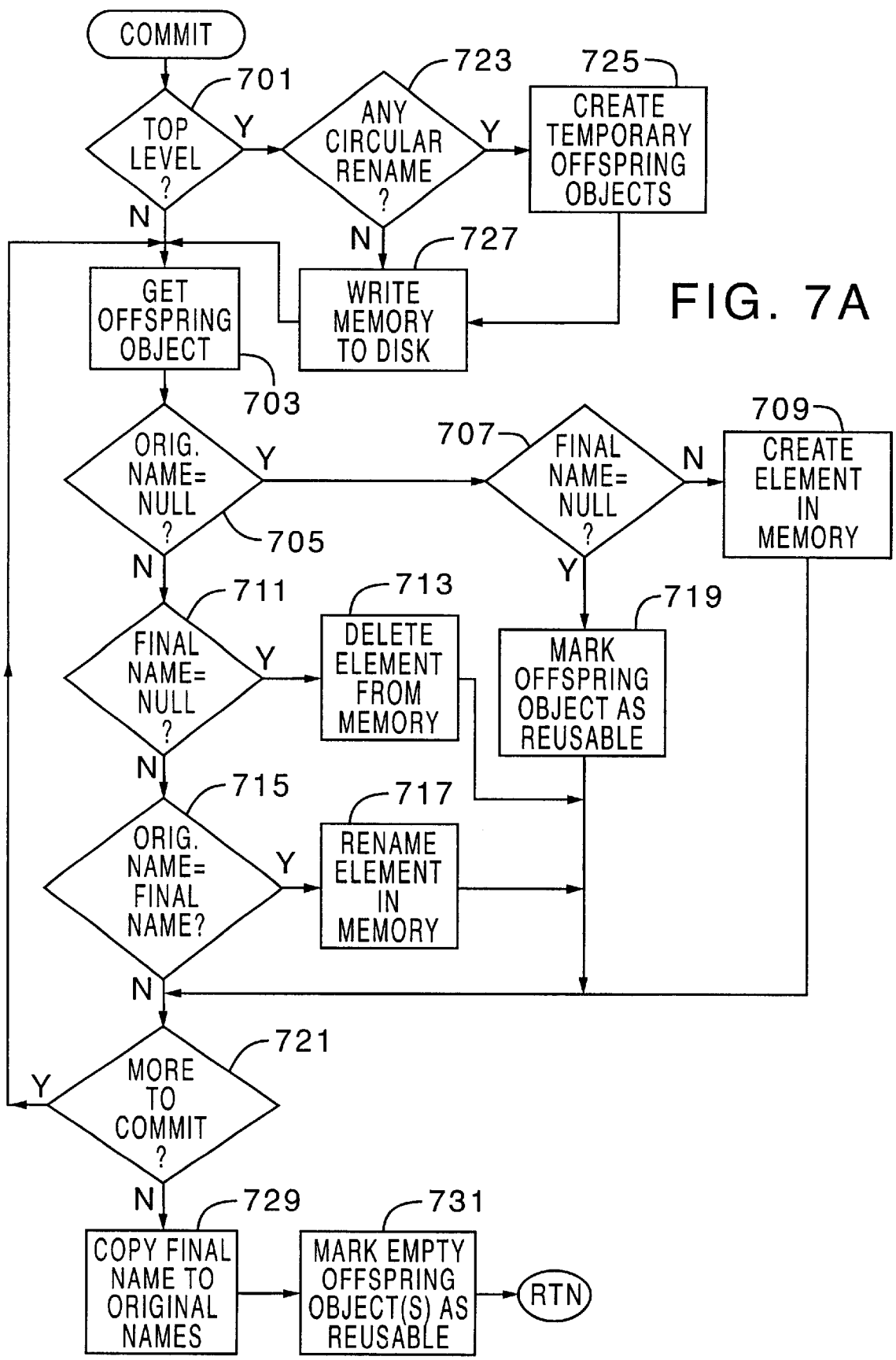

Turning now to the commit method shown in FIG. 7A, the file system first determines whether the commit is to the top level of the directory tree in memory (block 701). If it is not, then the file system obtains the offspring object that corresponds to the first element being committed (block 703). If the original name in the offspring object is NULL (block 705), then the offspring object corresponds to an element that was created by the transaction. If the final name in the offspring object is also NULL (block 707), then the element that was created was also deleted before the commit, so no further action is necessary on the element. The file system marks the offspring element as reusable (block 719). On the other hand, if the final name in the offspring object is not NULL, then the newly created element is written into memory (block 709).

If the original name of the offspring object is not set to NULL (block 705) and the final name is NULL (block 711), then the corresponding element was deleted by the transaction and the element is deleted from memory (block 713). On the other hand, if neither the original name nor the final name of the offspring object are NULL (blocks 705, 711), then the file system checks to see if the original name and the final names are identical (block 715). If they are not, then the element has been renamed and the file system re-names the element in memory. When the original and final names are identical and they are not NULL, there is no action to be taken by the file system because the corresponding element was opened but the name was not modified by the transaction.

After the appropriate processing is performed on each offspring element, the file system determines if there are more elements to commit (block 721) and cycles through the process described immediately above for each additional element. Once all the elements have been committed, the original names in the corresponding offspring elements are overwritten with the final names (block 729). Any resulting empty offspring elements are marked as reusable (block 731).

If the commit is for the top level of the directory tree (block 701), then the file system checks to determine if any of the renames result in a circular rename (block 723). If so, a temporary offspring object is created to account for the circular rename (block 725). The handling of circular renames is discussed in detail in the next section. In either case, he changes in memory are written to disk (block 727).

The file system examines the offspring object corresponding to the top-level element in the directory tree to determine if changes have been made to it (blocks 703, 705, 707, 711, 715). If the top-level element has changed, the appropriate modification is made to the disk copy of the element rather than to memory (blocks 709, 713, 715). As with the lower-level offspring objects, if the top-level offspring object was created and then deleted by the transaction, the corresponding offspring element is marked as reusable when the changes have been written to disk (block 719).

In an alternate embodiment in which the changes at each hierarchical level are written to disk when those changes are committed, the file system first examines all the offspring objects to be committed and determines if a circular rename exists (block 723). If so, it creates the appropriate temporary offspring objects (block 725) and then proceeds to block 703 to process each offspring object at the current commit level and writes the changes to disk rather than to memory (blocks 709, 713, 717). In this alternate embodiment, the processing represented by blocks 701 and 727 is not performed.

Figure 7B:
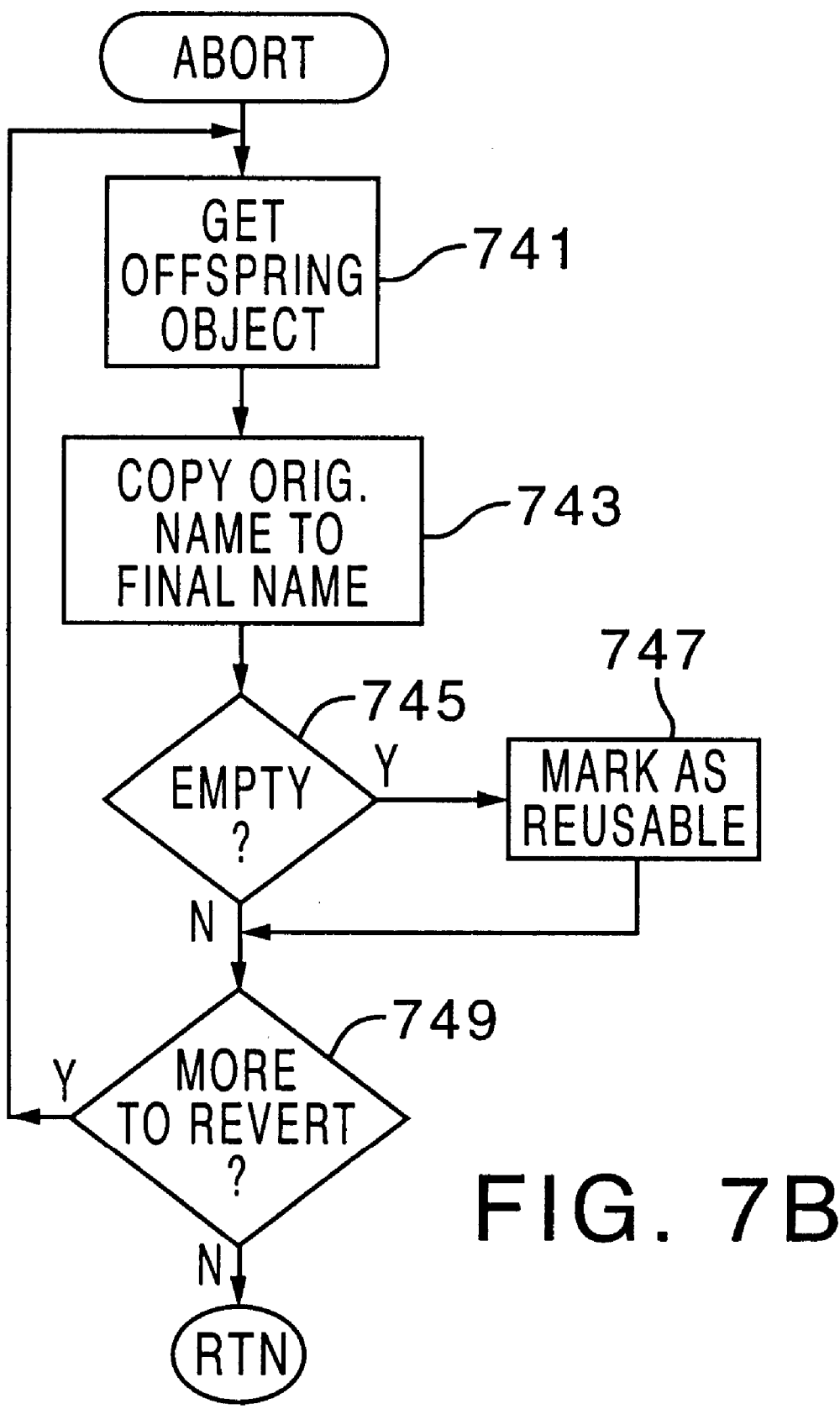

If a transaction aborts its changes rather than committing them, the corresponding offspring objects are reverted back to their original, open state as shown in FIG. 7B. The original name in offspring object is copied over the final name (block 743). If the resulting offspring object is empty (block 745), it is marked as reusable (block 747).

The particular methods performed by a file system of an exemplary embodiment of the invention have been described. The method performed by the file system has been shown by reference to a series of flowcharts including all the acts from 301 until 305, from 401 until 405, 501, 601, and from 701 until 727.

Windows NT NSS Implementation

In this section of the detailed description, a particular implementation of the invention is described that pertains to the Native Structured Storage (NSS) file format of Microsoft Windows NT 5.0.

Most file systems have traditionally been built around a directory-file hierarchy. A directory was viewed as a collection of files and the files themselves were viewed as a single stream of data bytes. This type of hierarchical file system was used to describe the exemplary embodiments in the previous sections.

With the advent of Microsoft's Component Object Model (COM), an object representing a spreadsheet could be embedded (or linked) in another object representing a word processing document so both objects had to be stored in a file that could be referenced by the word processing application. NSS accomplishes this by serializing the objects into a single file format, i.e., all objects included in a file are stored one after another in the file, called a "compound" file. A storage object can contain other storage objects and stream objects, and acts like a traditional directory. A stream object contains data stored as a single stream of data bytes, and acts like a traditional file. Storage and stream objects are collectively referred to herein as file objects.

Each compound file contains a root storage object that tracks the state of the file. Other storage objects reside below the root storage object and contain stream objects representing the embedded or linked objects. A storage object can contain other storage objects. Thus, a compound file can contain multiple levels of nested objects in parent-child relationships.

Figure 8A:
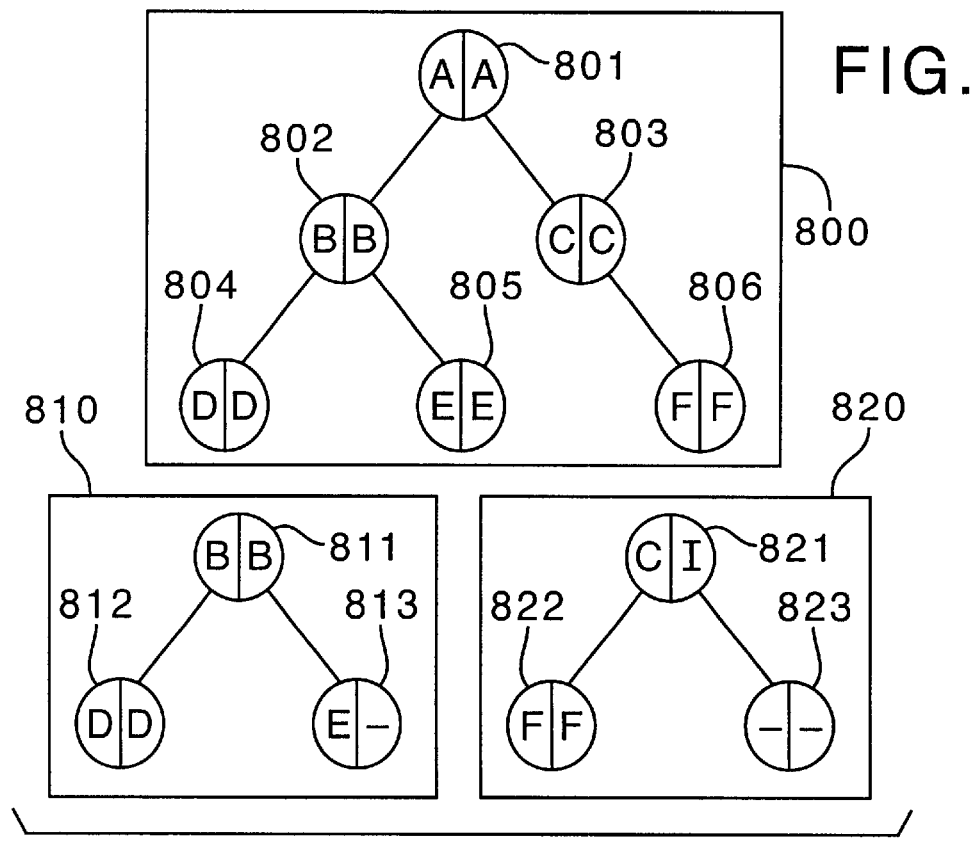
FIGS. 8A–D are diagrams illustrating transaction processing in an exemplary implementation of the invention.

A process which operates on an NSS compound file comprises multiple transactions, each of which is specific to a storage object, and its child stream objects, within the file, i.e., the transactions are nested in a similar fashion to the storage objects themselves. Each transaction is associated with a buffer in memory in which the offspring objects for its section of the hierarchy are stored. The process operating in the example shown in FIGS. 2A–2G has three transactions operative, transaction1 operating at the root level of storage object A, transaction2 operating at the second level of storage object B, and transactions operating at the second level of storage object C. FIG. 8A illustrates the buffer arrangement before any of the transactions commit their changes.

Transaction1 sees a copy of the offspring hierarchy in buffer 800 as it existed when the corresponding objects were first opened (referring back to FIG. 2A). Transaction2 sees a copy of the offspring objects in buffer 810 corresponding to storage object B, stream object D, and the deleted stream object E. Transaction3 sees a copy of the offspring objects in buffer 820 corresponding to storage object C, stream object F, and the deleted stream object G/H.

Figure 8B:
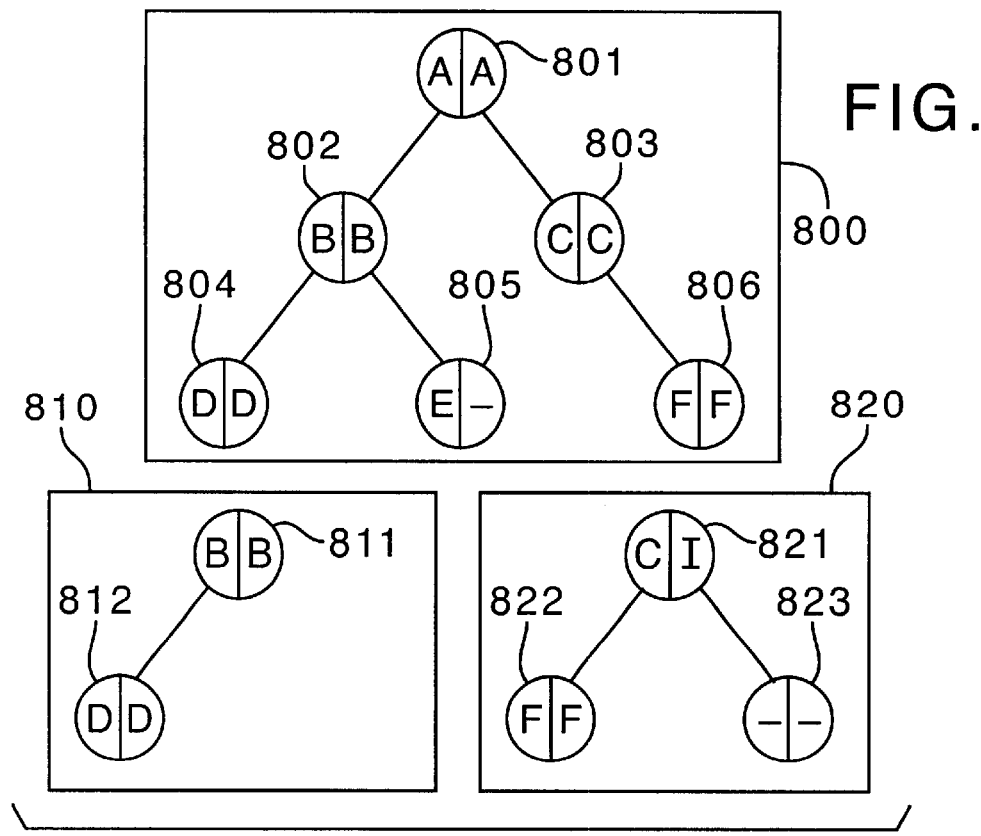

When transaction2 commits its changes, the offspring objects 811, 812, and 813 in buffer 810 are propagated into buffer 800 as shown in FIG. 8B. If transaction1 committed its changes at this point, the final names in the offspring objects in buffer 800 would be propagated to disk. In the NSS embodiment, the original names in the intermediate transaction level offspring objects in buffer 810 are overwritten with their final names so that the committed states for the offspring objects are maintained in memory for speed and the minimization of failure points. If transaction2 aborts its changes, the offspring objects 811, 812, and 813 would be reverted to their open state by copying the original name to the final name and they would not be propagated into buffer 800.

Figure 8C:
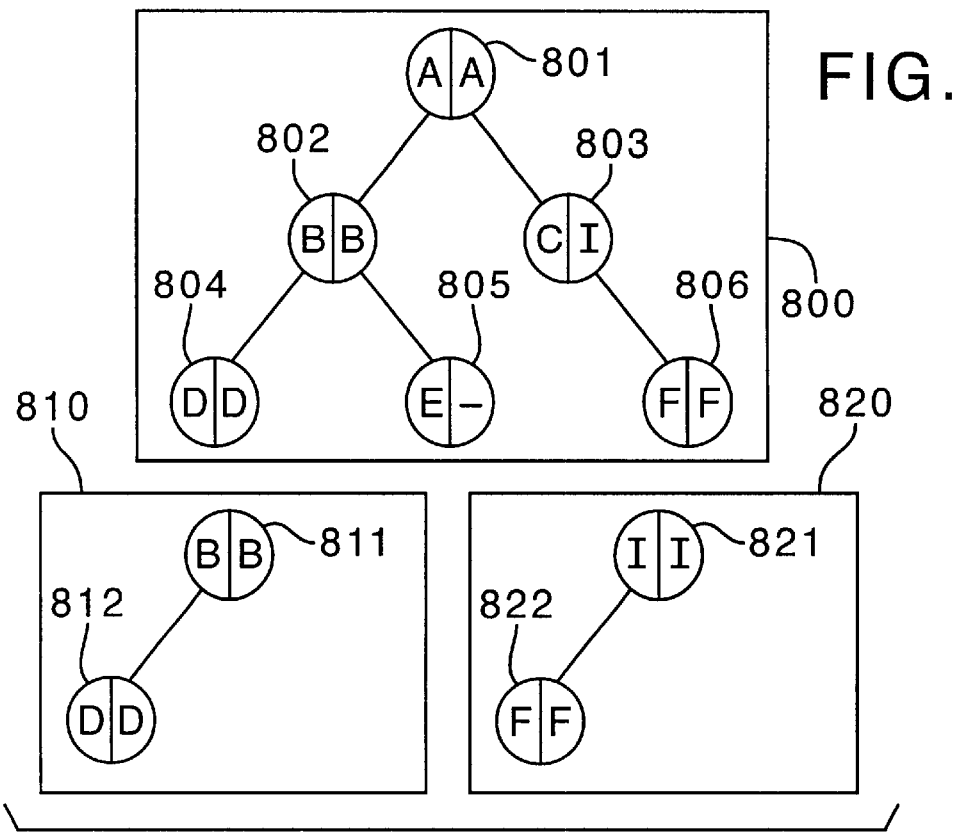

When transaction3 commits its changes, the offspring objects 821 and 822 in buffer 820 are propagated into buffer 800 as shown in FIG. 8C. Note that offspring object 823 is not propagated because it is empty. The offspring objects as committed in buffer 820 are kept in memory.

Figure 8D:
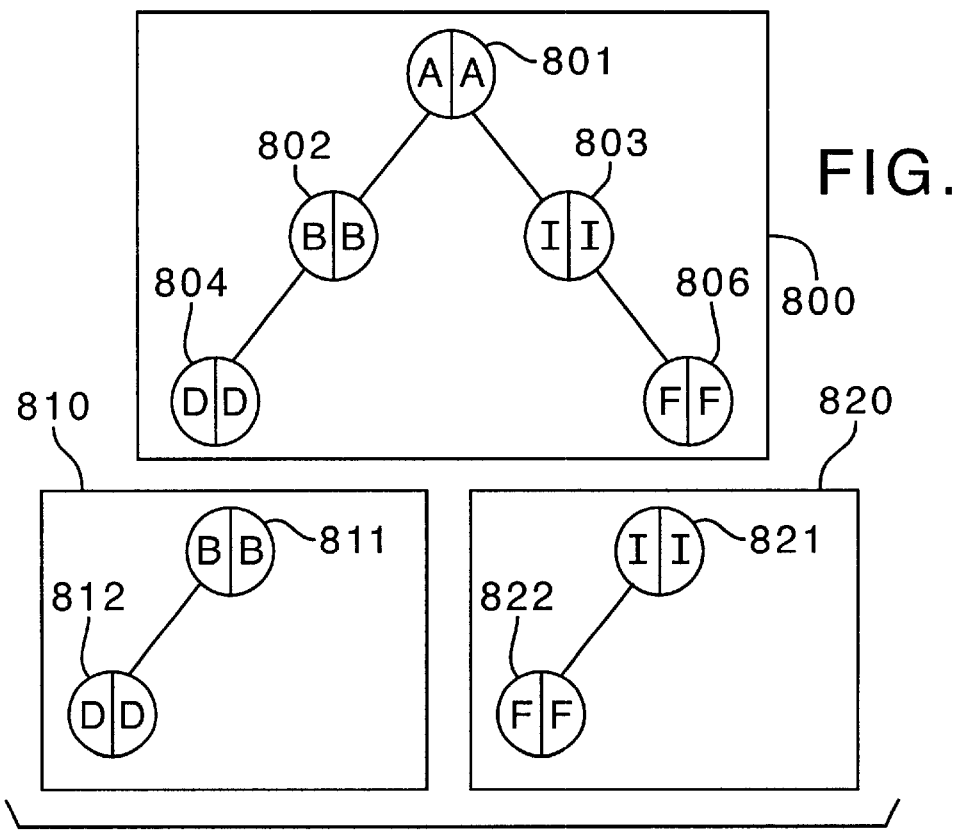

Now transaction1 commits the changes in buffer 800 to propagate the changes to disk. The offspring objects 801, 802, 804 and 806 cause no action to be taken because the new and old names are the same. Offspring object 805 causes the corresponding compound file object to be deleted because the new name is NULL. Offspring object 803 causes the corresponding compound file object to be renamed to the new name. After the changes are propagated to disk, the original names of the offspring objects in buffer 800 are replaced with the final names so that buffer 800 appears as shown in FIG. 8D.

The circular renaming of objects by transactions requires special handling when the top level transaction commits the changes to disk. For example, object A is renamed to C, object B is renamed to A, and object C is renamed B. This presents no problem when propagating the corresponding offspring objects from one level to the next. However, the file system cannot rename the compound file objects A or B because a compound file object with each new name already exists. Therefore, the file system checks for any offspring objects that would reflect a circular rename before writing the changes to disk, and replaces the offspring object A-B with two temporary offspring objects, A-X and X-B, where X is a dummy file name. The changes are then applied as A to X, B to A, and X to B.

Figure 9:
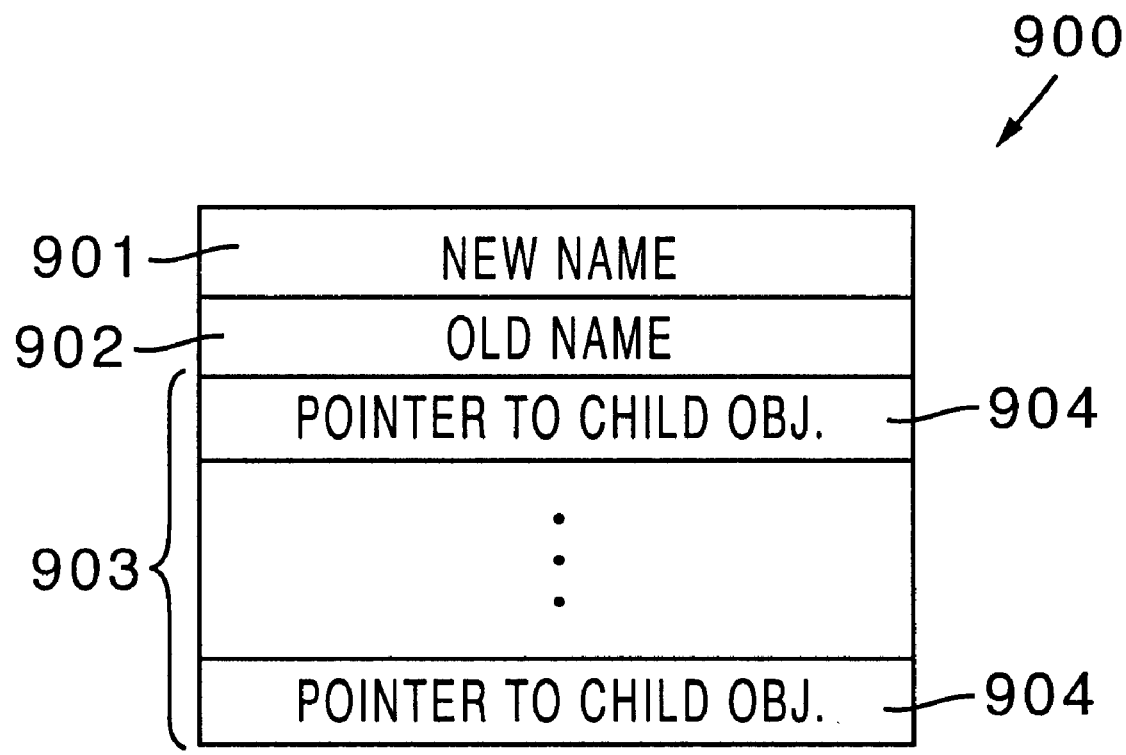
FIG. 9 is a diagram of an offspring data structure for use in an exemplary implementation of the invention.

The offspring objects of the present invention are implemented as a data structure shown in FIG. 9. The offspring data structure 900 contains a new name field 901 for the final name name, an old name field 902 for the original name name, and an instance list 903. For an offspring object corresponding to a storage object, the instance list contains a pointer 904 to each offspring object that is hierarchically below the offspring data structure 900 in a parent-child relationship. The instance list in an offspring object corresponding to a stream object is empty.

The offspring object is represented programmatically in the NT 5.0 file system as COffspring
{
private:
wchar_t * newName;
wchart_t * oldName;
COffspring*pInstanceList[ ];
} where the "newName" property corresponds to the new name field 901 and the "oldName" property corresponds to the old name field 902 in the data structure 900. The "pInstanceList" property is an array of pointers to offspring objects which corresponds to the pointers 904 which make up the instance list 903 in the data structure 900.

As described in the previous sections, the primary operations on objects in a NSS compound file are create, delete, rename, and open/close which correspond to states in the COffspring objects. The "create" state of a COffspring object is indicated by having its newName property set to a value and its oldName property set to NULL. A COffspring object in the "delete" state has its newName property set to NULL and its oldName property set to a value. The "empty" state has both the COffspring object properties set to NULL. The "rename" state of a COffspring object is indicated by values in the newName and oldName properties that are not equal. A COffspring object is in the "open" state when both properties have the same value. The file system uses the state of the COffspring object to determine what changes to make to the name of the corresponding storage/stream object when the changing transaction commits.

An implementation of the offspring objects of the present invention has been described that operates as part of the Microsoft Windows NT 5.0 file system in support of Native Structured Storage compound file formats. A combination of buffers and transactions has been described as well as a data structure for the offspring object.

Conclusion

An offspring object for use with a transaction-oriented hierarchical file system has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, as described above, the offspring objects provide a "rollforward" function in that the changes are not written to memory, or to persistent storage, until the changes are committed. One of ordinary skill in the art will immediately perceive that the offspring objects can also be used to provide a "rollback" function. In this embodiment, the changes are immediately written to memory and/or to persistent storage and the offspring objects are used to rollback the changes if the changes are aborted. This rollback function is contemplated as within the scope of the invention.

Furthermore, the concept of the offspring object can be extended so that the final state (if providing rollforward) or original state (if providing rollback) of the data in the corresponding element is maintained by the offspring object in some fashion, e.g., the offspring object can contain a pointer to a memory location containing the appropriate data. A commit causes the data to be written to the corresponding element in memory and/or persistent storage.

The terminology used in this application with respect to is meant to include all file system environments which support transactions and is not limited to only those that are object-based. In particular, the use of the term object is intended to cover any data structure having the characteristics described above. Additionally, the invention is applicable to files having a format that offers file system-like features, as described in conjunction with the NSS embodiment of the previous section. Therefore, it is manifestly intended that this invention be limited only by the following claims and equivalents thereof.

I claim:

1. A computerized method for implementing transactions on a file comprising:

creating an offspring object in response to a file object being opened, wherein the offspring object contains an original name for the corresponding file object;

storing a final name in the offspring object in response to a transaction requesting a first name change to the corresponding file object;

modifying the final name in response to the transaction requesting a second name change to the corresponding file object; and applying the final name in the offspring object to the corresponding file object when the transaction commits.

2. The computerized method of claim 1, further comprising:

determining a state for offspring object by comparing the original name and the final name; and marking the offspring object as reusable when the state is empty.

3. The computerized method of claim 1, further comprising:

replacing the original name with the final name in the offspring object when the transaction commits.

4. The computerized method of claim 1, further comprising:

replacing the final name with the original name in the offspring object when the transaction aborts.

5. The computerized method of claim 1, further comprising:

using the existing offspring object when the corresponding file object is invoked after the transaction commits.

6. The method of claim 1, wherein each act is performed in an order recited in claim 1.

7. A computer-readable medium having computer-executable instructions to cause a computer to perform the method of claim 1.

8. A computerized system comprising:

a computer having a processor, a memory, and a persistent storage;

a file system executing in the processor to manage a plurality of data elements logically stored in a hierarchical structure on the persistent storage;

a plurality of transactions executing in the processor under control of the file system to change the names of the data elements, wherein each transaction operates on a subset of the data elements defined by a specific level of the hierarchy;

a plurality of offspring objects created by the file system in a plurality of buffers in the memory to record a state for each of the data elements on persistent storage when the data element is opened by a transaction, each offspring object containing an original name for the corresponding data element when opened by a transaction and a last name change made to the name of the corresponding data element by the transaction, wherein the original name and the last name change collectively determine the state of the corresponding data element.

9. The computerized system of claim 8, wherein a temporary offspring object is created in memory when the file system detects that a transaction has changed a data element in a circular fashion.

10. The computerized system of claim 8, wherein each of the buffers is associated with a transaction and a commit performed by a transaction copies the offspring objects in the buffer associated with the committing transaction to the buffer associated with the transaction operating the next higher level in the hierarchy.

11. The computerized system of claim 10, wherein the file system modifies the state of the data elements on persistent storage to match the state contained in the corresponding offspring objects in the buffer associated with the transaction operating at the highest level of the hierarchy when the transaction operating at the highest level commits.

12. The computerized system of claim 10, wherein the original name in each offspring object in a buffer associated with a transaction operating at a lower level of the hierarchy is overwritten with the last name change in the offspring object when the offspring objects are copied to the buffer associated with the transaction operating at the next high level in the hierarchy.

13. The computerized system of claim 10, wherein the last name change in each offspring object in a buffer is overwritten with the original name in the offspring object when the transaction associated with the buffer aborts.

14. The computerized system of claim 10, wherein the data elements comprise directory and file data structures.

15. The computerized system of claim 10, wherein the data elements comprise storage and stream objects within a file.

16. A computer-readable medium having computer-executable instructions to cause a computer to perform a method comprising:

creating an offspring object in response to a file object being opened, wherein the offspring object contains an original name for the corresponding file object;

storing a final name in the offspring object in response to a transaction requesting a first name change to the corresponding file object;

modifying the final name in response to the transaction requesting a second name change to the corresponding file object; and applying the final name in the offspring object to the corresponding file object when the transaction commits.

17. The computer-readable medium of claim 16, having computer-executable instructions to cause a computer to perform a method further comprising:

determining a state for offspring object by comparing the original name and the final name; and marking the offspring object as reusable when the state is empty.

18. The computer-readable medium of claim 16, having computer-executable instructions to cause a computer to perform a method further comprising:

replacing the original name with the final name in the offspring object when the transaction commits.

19. The computer-readable medium of claim 16, having computer-executable instructions to cause a computer to perform a method further comprising:

replacing the final name with the original name in the offspring object when the transaction aborts.

20. The computer-readable medium of claim 16, having computer-executable instructions to cause a computer to perform a method further comprising:

using the existing offspring object when the corresponding file object is invoked after the transaction commits.

21. The computer-readable medium of claim 16, wherein each act is performed in an order recited in claim 16.

22. A computer-readable medium having stored thereon an offspring data structure which encodes its own state comprising:

a first field comprising one of a null value and data representing an old name for an object; and a second field comprising one of a null value and data representing a new name for the object;

wherein a state of the offspring data structure is identified by the contents of both the first and second fields taken together such that the combination of the data and the null values of the first and second fields define the state comprising one of delete, create, empty, open and rename.

23. The computer-readable medium of claim 22, further comprising:

a third field containing data representing a least one pointer to another offspring data structure corresponding to a child object for the object identified by the first field.

24. The computer-readable medium of claim 22, wherein the state of the offspring structure is delete when the first field comprises the data representing the old name and the second field comprises the null value.

25. The computer-readable medium of claim 22, wherein the state of the offspring structure is create when the first field comprises the null value and the second field comprises the data representing the new name.

26. The computer-readable medium of claim 22, wherein the state of the offspring structure is empty when the first field comprises the null value and the second field comprises the null value.

27. The computer-readable medium of claim 22, wherein the state of the offspring structure is open when the first field comprises the data representing the old name, the second field comprises the data representing the new name, and the data in the first and second field are identical.

28. The computer-readable medium of claim 22, wherein the state of the offspring structure is rename when the first field comprises the data representing the old name, the second field comprises the data representing the new name, and the data in the first and second field are not identical.

* * * * *

UNITED STATES PATENT AND TRADEMARK OFFICE
CERTIFICATE OF CORRECTION

PATENT NO.    : 6,405,217 B1
DATED         : June 11, 2002
INVENTOR(S)   : Lee

It is certified that error appears in the above-identified patent and that said Letters Patent is hereby corrected as shown below:

Column 5,
Line 5, "each offspring. object contains" should read -- each offspring object contains --.

Column 6,
Line 54, "to the any of the" should read -- to any of the --.

Column 8,
Line 17, "in shown" should read -- as shown --.
Line 64, "he" should read -- the --.

Column 10,
Line 6, "transactions" should read -- transaction3 --.

Column 14,
Line 36, "a least" should read -- at least --.

Signed and Sealed this

Eleventh Day of November, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,405,217 B1
DATED          : June 11, 2002
INVENTOR(S)    : Lee It is certified that error appears in the above-identified patent and that said Letters Patent is hereby corrected as shown below:

Column 5,
Line 5, "offspring.object" should read -- offspring object --.

Column 6,
Line 54, "to the any of the" should read -- to any of the --.

Column 8,
Line 17, "in shown" should read -- as shown --.
Line 64, "he" should read -- the --.

Column 10,
Line 6, "transactions" should read -- transaction3 --.

Column 14,
Line 36, "a least" should read -- at least --.

Signed and Sealed this

Thirteenth Day of April, 2004

JON W. DUDAS
*Acting Director of the United States Patent and Trademark Office*